United States Patent [19]

Ziv

[11] 4,451,062
[45] May 29, 1984

[54] AUTOMATIC LOCKING SAFETY BELT RETRACTION APPARATUS WITH RESETTING MEANS

[75] Inventor: Avraham Ziv, Sepulveda, Calif.

[73] Assignee: American Safety Equipment Corporation, Troy, Mich.

[21] Appl. No.: 294,820

[22] Filed: Aug. 20, 1981

[51] Int. Cl.³ .............................................. B60R 21/10
[52] U.S. Cl. .................................. 280/806; 242/107.2
[58] Field of Search ................................ 280/806, 801; 242/107.2

[56] References Cited

U.S. PATENT DOCUMENTS

| 227,275 | 1/1981 | Ziv | 242/107.2 |
|---|---|---|---|
| 3,372,777 | 3/1968 | Filippi et al. | 280/806 |
| 3,504,867 | 4/1970 | Stevenson | 242/107.2 |
| 3,918,658 | 11/1975 | Beller | 242/107.4 |
| 4,181,326 | 1/1980 | Hollowell et al. | 280/806 |
| 4,209,186 | 6/1980 | Close | 280/803 |
| 4,235,455 | 11/1980 | Collins et al. | 280/806 |
| 4,344,588 | 8/1982 | Hollowell et al. | 280/806 |
| 4,360,171 | 11/1982 | Reid et al. | 280/806 |

FOREIGN PATENT DOCUMENTS

| 2350328 | 4/1975 | Fed. Rep. of Germany . | |
| 2516075 | 11/1975 | Fed. Rep. of Germany | 280/806 |
| 3020505 | 12/1981 | Fed. Rep. of Germany . | |
| 2215846 | 8/1974 | France . | |
| 2226840 | 11/1974 | France . | |
| 2279589 | 2/1976 | France | 280/806 |
| 2383677 | 10/1978 | France . | |
| 532494 | 2/1973 | Switzerland . | |

Primary Examiner—Joseph F. Peters, Jr.
Assistant Examiner—Ross Weaver
Attorney, Agent, or Firm—Poms, Smith, Lande & Rose

[57] ABSTRACT

A safety belt webbing emergency locking apparatus having one or more wedge shaped clamp members for clamping directly upon the safety belt webbing to prevent further safety belt protraction has biasing means for normally biasing the clamping means to a webbing clamping position, releasable retaining means for normally holding the clamping means in a webbing release position against the bias of the biasing means, vehicle inertia sensor means for sensing changes in vehicle inertia and operating the releasable retaining means to release the clamping means to clamp the webbing under the urging of said biasing means when the sensor means experiences a change in vehicle inertia of more than a predetermined amount and automatically operating reset means for resetting the retaining means after a belt webbing clamping mode whereby the clamping means is moved back to a webbing release position and held in such position against the bias of the biasing means, the automatically operating reset means operating in response to operation of a part of the vehicle, the vehicle part being preferably the vehicle door and the reset means including a door operative switch and cable assembly or electrical solenoid connected to the releasable retaining means.

3 Claims, 13 Drawing Figures

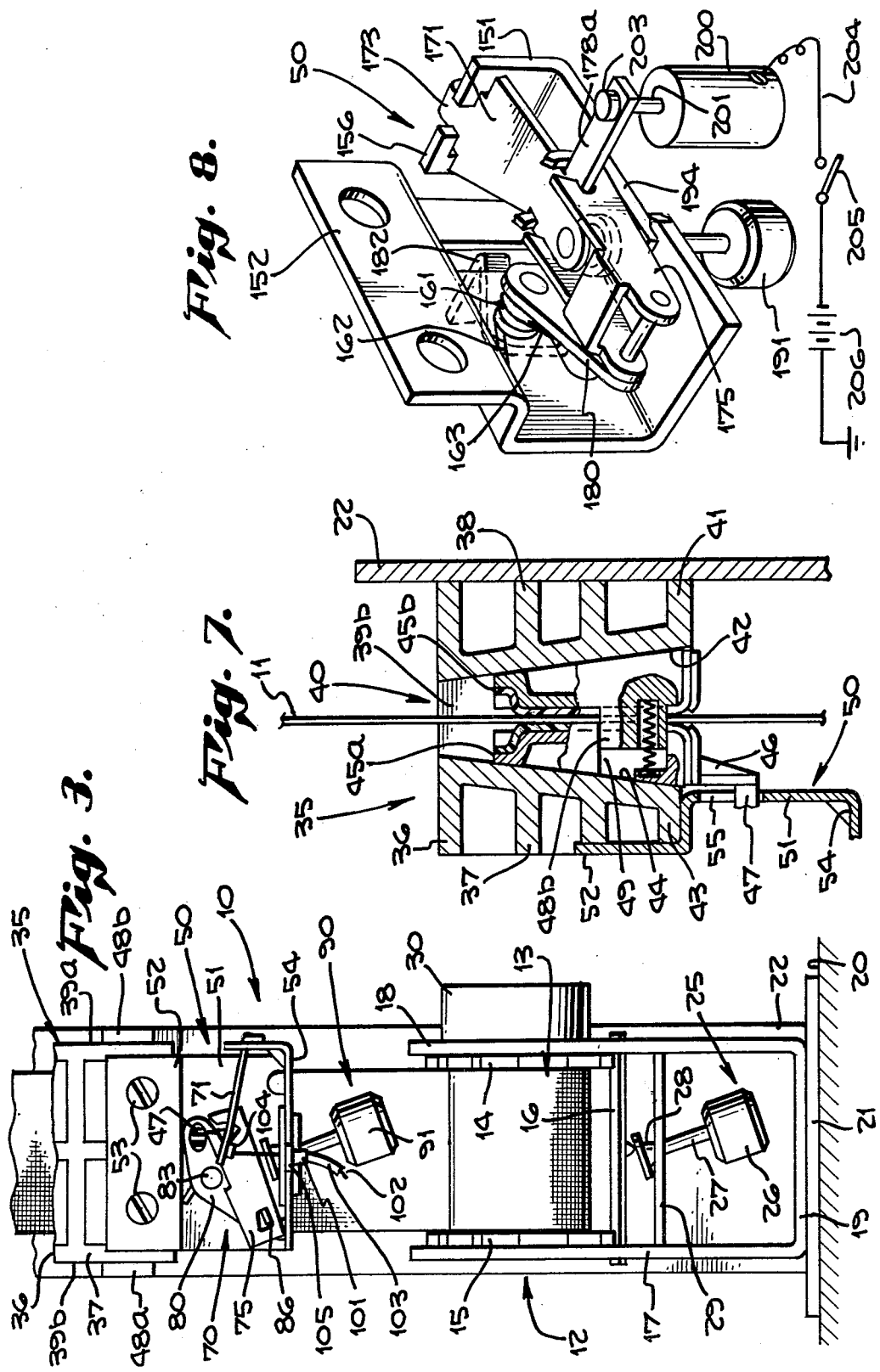

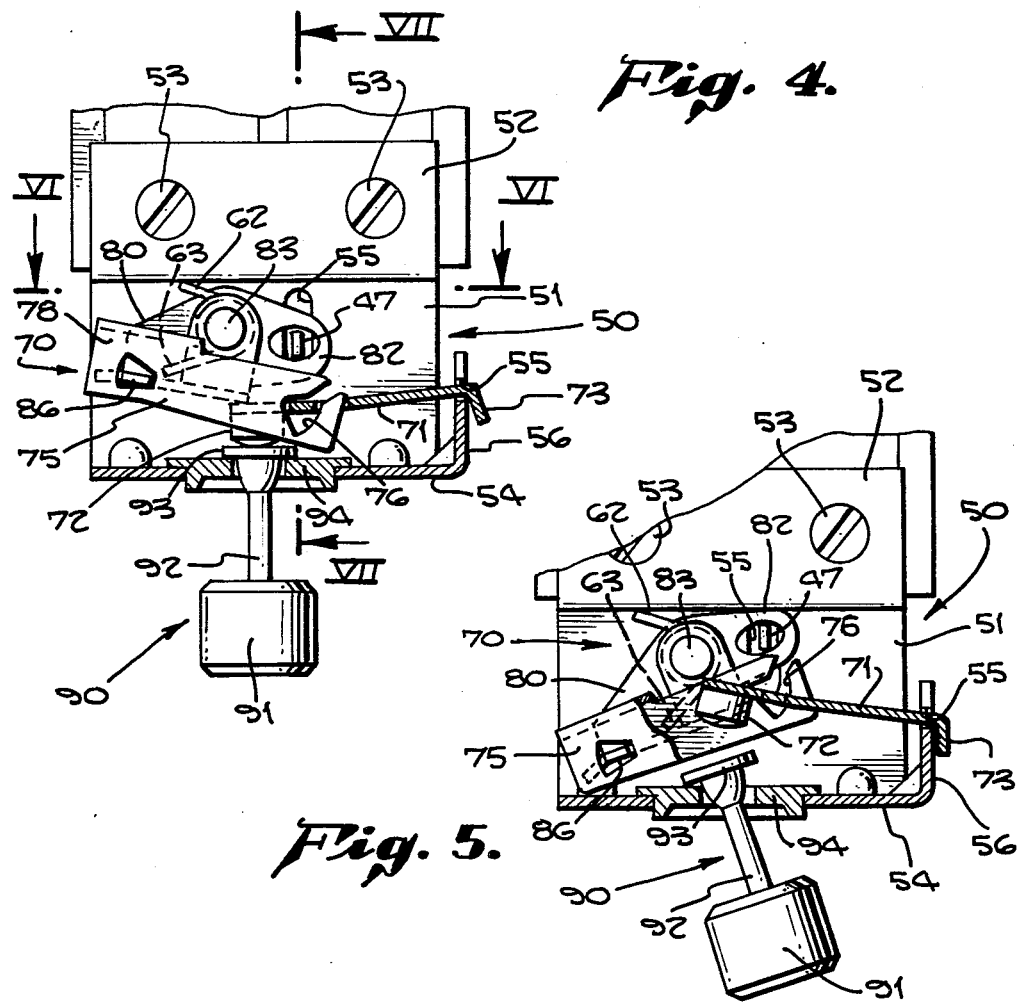
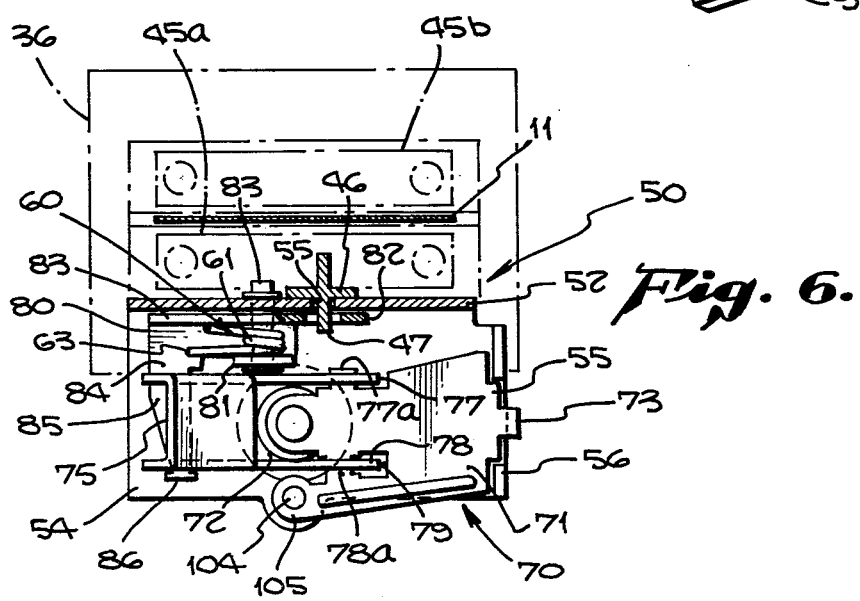

AUTOMATIC LOCKING SAFETY BELT RETRACTION APPARATUS WITH RESETTING MEANS

BACKGROUND OF THE INVENTION

Generally stated the present invention relates to safety belt webbing emergency locking apparatus for use in automotive vehicles wherein the locking apparatus is actuated to a belt locking condition in response to changes in vehicle inertia of more than a predetermined amount. More particularly, the present invention relates to means for operating the webbing locking means to a webbing lock condition and resetting such means to a webbing unlocked condition automatically in response to operation of a part of the vehicle.

Safety belt webbing emergency locking apparatus have been developed heretofore for use in automotive vehicles including the now conventional safety retractor upon which safety belt webbing is stored with vehicle inertia sensor means for automatically locking the retractor against further belt protraction therefrom in the event of deceleration or acceleration of the vehicle as may occur in emergency conditions. As disclosed in the copending application for U.S. patent Ser. No. 227,275 filed Jan. 28, 1981 and entitled SAFETY BELT WEBBING EMERGENCY LOCKING APPARATUS it is been proposed to employ additional clamping means for clamping directly upon portions of the webbing of the safety belt in response to such changes in vehicle inertia. As more fully disclosed in said pending application, such clamping means may be employed in addition to a conventional vehicle inertia sensing retractor or in place thereof. In the prior disclosure of said application, manual means were provided for resetting the disclosed clamping means after the emergency conditions experienced by the vehicle were ended.

It is the primary object of the present invention to disclose and provide a means for automatically resetting the safety belt webbing clamping means and its associated actuating means to a webbing relesse position after a vehicle emergency condition has ended in order to obviate the need for a manual resetting thereof as in the embodiment of application Ser. No. 227,275.

It is a still further object of the present invention to disclose and provide an improved releasable retaining means for holding a safety belt webbing clamping means against its normal bias toward webbing locking condition until an associated vehicle inertia sensor operates the same, an improved triggering arrangement for operating the retaining means to a release position whereby the clamping means clamps the associated webbing and automatically operating reset means which function mechanically or electrically in response to operation of some part of the vehicle which would be operated after an emergency condition has ended.

SUMMARY OF THE INVENTION

Generally stated, the present invention is intended for its optimum utilization in association with a safety belt webbing emergency locking apparatus of the type having clamping means including one or more wedge shaped clamp members for clamping directly upon the webbing, biasing means for biasing the clamping means to a webbing clamping position preventing safety belt movement, and a vehicle inertia activating means for sensing changes in vehicle inertia of more than a predetermined amount and includes an improved releasable retaining means including an actuator link associated with the clamping means, a trigger link associated with the vehicle inertia sensor means and an over center link disposed between said actuator link and trigger link for normally holding the clamping means in a webbing release position against the bias of the aforesaid biasing means until the trigger link is actuated by the vehicle sensor means and automatically operating reset means for resetting the retainer means to a reset position, the reset means preferably including a door operated mechanical or electrical switch operating a cable or electrical solenoid connected to the trigger to restore the trigger link, over center link, actuator link and associated clamping means to a webbing release position in response to opening of the vehicle door after an emergency condition sufficient to cause operating of the vehicle inertia sensor associated with the clamping means has ended.

It is believe that a better understanding of the present invention will be afforded, and additional advantages and objects will be recognized, by those skilled in the art from a consideration of the following detailed descriptions of preferred and alternative embodiments thereof. Reference will be made to the appended sheets of drawings which will first be described briefly.

BRIEF DESCRIPTION OF THE DRAWINGS

FIG. 3 is a elevational view as in FIG. 1 showing the clamping means and associated safety belt retractor in belt clamping and locking positions respectively.

FIG. 4 is a detail view of an exemplary releasable retaining means in accordance with the present invention shown in a position wherein the associated clamping means is held in a belt release position.

FIG. 5 is a view as in FIG. 4 showing the releasable retaining means in a release wherein the associated clamping means is in a belt clamping position.

FIG. 6 is a horizontal section view of the apparatus of FIG. 4 taken therein along the plane VI—VI.

FIG. 7 is a vertical section view of the apparatus of FIG. 4 taken therein along the plane VII—VII.

FIG. 8 is a detail view of an alternative exemplary embodiment of releasable retaining means and automatically operating reset means in accordance with the present invention.

DETAILED DESCRIPTION OF A PREFERRED EXEMPLARY EMBODIMENT

Figures 1, 2:
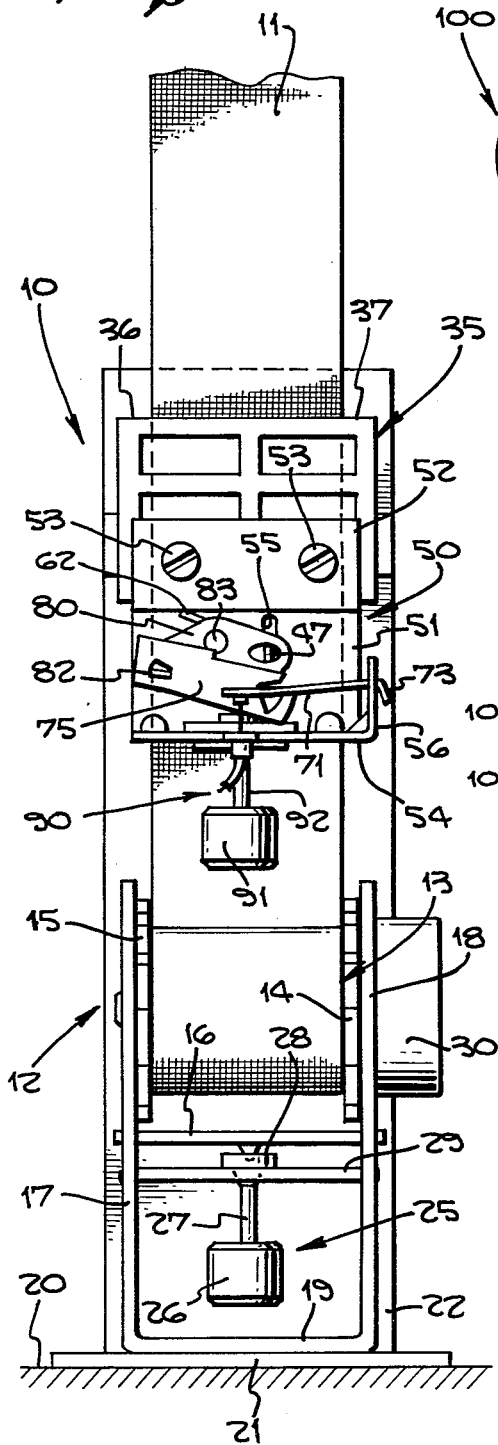
FIG. 1 is an elevational view of an exemplary safety belt webbing emergency locking apparatus of the type having clamping means for clamping a safety belt webbing stored upon a safety belt retractor, said apparatus being exemplary of the type of apparatus in which the present invention in automatically operating reset means finds particularly suitable use.
FIG. 2 is a side view of the apparatus of FIG. 1 showing an exemplary embodiment of automatically operating reset means in accordance with the present invention.
Figure 9:
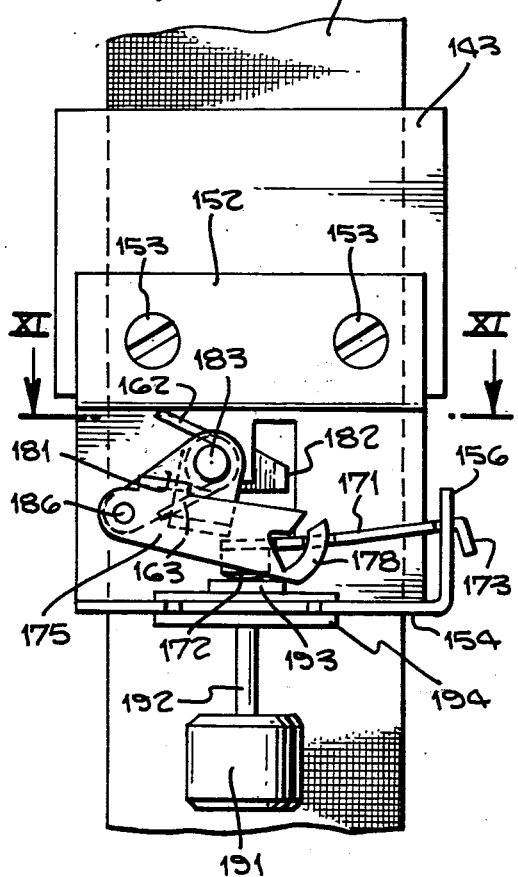
FIG. 9 is a front view of the exemplary embodiment of apparatus of FIG. 8 shown in association with an alternative exemplary embodiment of clamping means.
Figure 10:
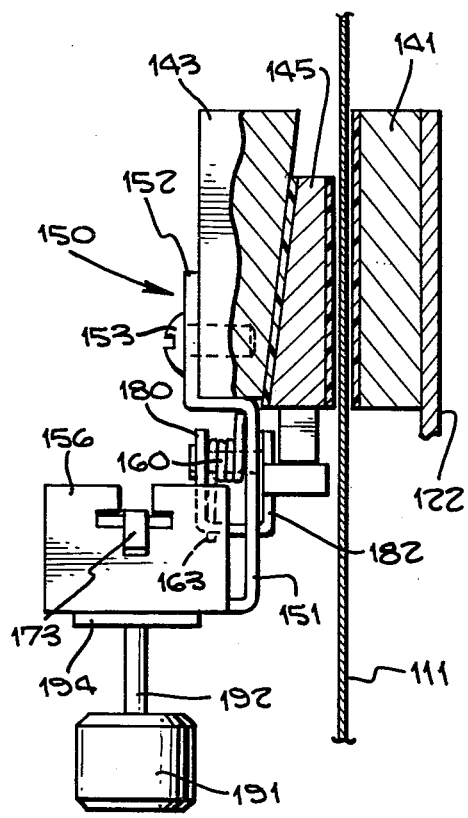
FIG. 10 is a side view, partially in section, of the apparatus of FIG. 9.
Figure 11:
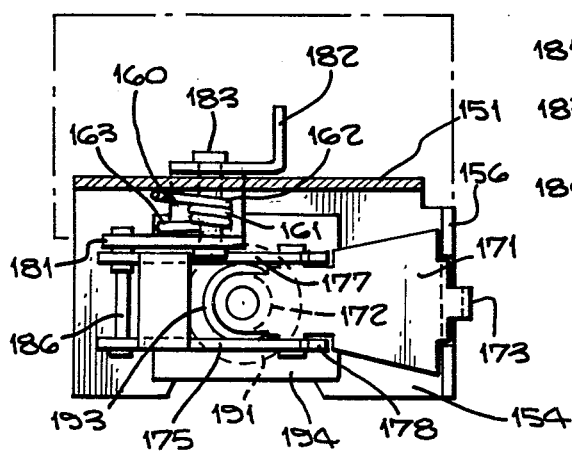
FIG. 11 is a horizontal section view of the apparatus of FIG. 9 taken therein along the plane XI—XI.
Figure 12:
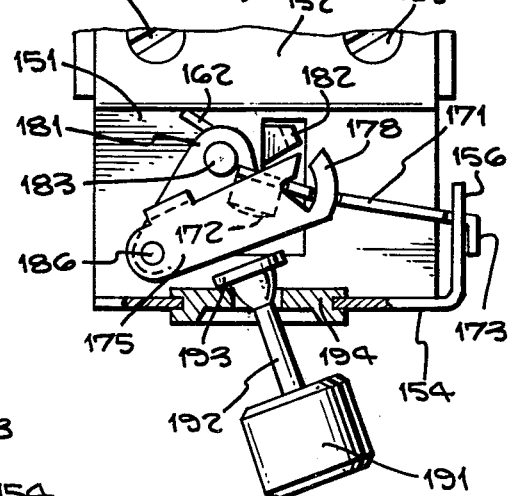
FIG. 12 is a detail view of the apparatus of FIG. 9 showing the alternative exemplary embodiment of releasable retaining means in a released position.

Referring now to FIGS. 1, 2 and 3, initially, an exemplary embodiment of safely belt webbing emergency locking apparatus is illustrated generally at 10 wherein a safety belt webbing 11 is wound upon a conventional safety belt retractor 12 having a webbing storage spool 13 with spoot ratchet wheels 14 and 15 being engageable by lock bar 16 in known manner. Lock bar 16 is pivoted at its outer ends in the retractor frame side walls 17 and 18, respectively, the frame being of conventional U-shaped configuration with the frame base 19 being mounted to the vehicle frame or support structure 20 by a base plate or vehicle floor 21. Vertical column 22 is exemplary of the B-pillar of a conventional automobile, the installation of the safety belt retractor being in accordance with known methods, the illustration in FIGS. 1, 2 and 3 being merely illustrative thereof.

The exemplary safety belt retractor, indicated generally at 12, is provided in known manner with a vehicle inertia sensor means, indicated generally at 25, which, in the exemplary embodiment, includes a conventional pendulum having a mass 26 supported on stem 27 depending from head 28, head 28 being mounted in an aperture in support bar 29 beneath lock bar 16 in position to engage it and move it into engagement with the ratchet wheels 14 and 15 when the vehicle encounters a change of inertia of more than a predetermined amount. Webbing 11 is normally biased toward a wound up position on the retractor spool by a conventional wind up spring provided within spring housing 30 in conventional manner.

As is more fully described in the copending United States patent application Ser. No. 227,275 filed Jan. 28, 1981 entitles SAFETY BELT WEBBING EMERGENCY LOCKING APPARATUS, the disclosure of which is incorporated herein by reference, the exemplary emergency locking apparatus indicated generally at 10 is of the type having clamping means, indicated generally at 35, for clamping directly upon webbing 11 when an associated sensor means senses a vehicle inertia change of more than a predetermined amount. Clamping means 35 may be provided to clamp webbing 11 at higher levels of vehicle inertia change, referred to as higher G levels, than the retractor indicated generally at 12 is set. As discussed in said copending application Ser. No. 227,275, the clamping means may therefore be employed to positively clamp webbing 11 against protraction relative to the emergency locking apparatus 10 in vehicle collision circumstances while the retractor 12 may be operable in response to sudden stopping of the vehicle or the like. As will be discussed more fully hereinafter, while the retractor indicated generally at 12 is self resetting when an emergency condition ceases, the exemplary clamping means indicated generally at 35 is not self resetting without the provision of the automatically operating reset means of the present invention which will be described subsequently in association therewith.

Referring now to FIG. 7, in addition to FIGS. 1 through 3, the exemplary clamping means, indicated generally at 35, includes a housing 36 having a front wall 37, back wall 38, right hand side wall 39a and a left hand side wall 39b with the housing being mounted to the column 22 which is exemplary of a B-pillar of a modern day automotive vehicle. Housing 36 is provided with a webbing passage, indicated generally at 40 in FIG. 7, through which the webbing 11 normally passes freely. A base clamp block 41 is provided with a webbing facing inclined surface 42 opposite to an opposing clamp block 43 presenting an inclined surface 44 also facing inwardly toward webbing 11, surfaces 42 and 44 opposing each other and being convergent in an upward direction relative to housing 36. A pair of wedge shaped clamp members 45a and 45b are provided in assembled relation between blocks 41 and 43 and riding against the block surfaces 42 and 44 as best seen in FIG. 7. Clamp member 45a is provided with a depending foot portion 46 which has a horizontally extending projection 47 which cooperates with the wedge actuating means as subsequently described. Wedge members 45a and 45b are formed with mating tongue and groove type side engagements, laterally outwardly of webbing 11 as side ears 48a and 48b on wedge member 45b fit within slide grooves, as groove 49 in FIG. 7, with spring biasing means normally urging the wedge members apart when in a release position to facilitate free sliding movement of webbing 11 thereby. The clamp members 45a and 45b are preferably coated with a layer of pliant, high strength, resilient material having a preferably relatively low coefficient of friction characteristic on the surfaces thereof which face toward webbing 11 to facilitate even distribution of clamping loads upon the webbing when the wedge members are moved to a webbing clamping position.

Actuating means for moving the wedge members 45a and 45b upwardly in FIG. 7 to a webbing clamping position are provided in the exemplary embodiment and are indicated generally at 50 in the drawings. Such means includes a support bracket 51 having a top flange 52 mounted by fasteners, such as screws 53, to the front wall 37 of housing 36. Support bracket 50 is further provided with a bottom flange 54 including aperture 55 and a side flange 56 as discussed hereinafter. The support bracket mounts biasing means, indicated generally at 60, for normally biasing wedge members 45a and 45b toward a webbing clamping position, releasable retaining means indicated generally at 70 for normally holding the wedge members from movement under the urging of the biasing means and a vehicle inertia sensor means, indicated generally at 90, for operating the releasable retaining means 70 to allow movement of wedge member 45 and 45b into webbing clamping position under the urging of the spring means indicated generally at 60 when the inertia sensor means senses a change in vehicle inertia of more than a predetermined amount.

The exemplary biasing means, indicated generally at 60 includes a coil spring 61 having one free end 62 abutting beneath a portion of bracket 51 where the bracket is off set inwardly relative apparatus 10 and the bracket flange 52 from which the bracket body depends. An opposite end 63 of spring 61 bears against a portion of the releasable retaining means 70 which will now be described.

Releasable retaining means, indicated generally at 70, in the exemplary embodiment include a trigger link 71 which is adapted to be actuated by the head 93 of the inertia sensor 90. Link 71 is provided with a contact pad 72 overlying pendulum head 93 and is pivoted at its opposite end by means of the downturned end 73 lying outwardly of slot 55 in flange 56, link 71 riding in slot 55 in pivotal fashion and being retained there by downturned end 73. An overcenter link 75, as best seen in FIGS. 4, 5 and 6, is of generally U-shaped configuration having the ends of its two side arms slotted, as slot 76 in FIG. 4, to pivotally receive portions of trigger link 71, the inner side 77 in FIGS. 6 receiving trigger link ear 77a and the outer side 78 receiving a bar portion 78a of the trigger link as best seen in FIG. 6. Bar 78a is formed by the provision of an aperture 79 in link 71 as seen in FIG. 6 in plan view.

A reaction link 80 is pivotally mounted on pivot pin 81 mounted to bracket 51 with an apertured arm 82 receiving projection 47 therethrough as best seen in FIGS. 4, 5 and 6. Referring particularly to FIG. 6, reaction link 80 has an oppositely extending arm 83 having a bottom flange 84 against which biasing means spring arm 63 abuts. Flange 84 is further provided with an outwardly extending arm 85 pivotally engaging overcenter link 75 with an end tab 86 lying outwardly of aperture 87 provided in side wall 78 of link 75.

As can be seen from a comparison of FIGS. 4 and 5, together with the plan view of FIG. 6, the releasable retaining means indicated generally at 70, includes the trigger link 71 overcenter link 75 and actuator link 80 for normally holding the wedge members 45a and 45b in a webbing release portion. When the clamping means wedge members are in a webbing release position, the releasable retaining means is in the position of FIG. 4 wherein the bias of spring means 60, as applied by spring end 63 against flange 84 of actuator link 80 tends to move link arm 82 upwardly in FIG. 4 to raise projection 47 and the associated wedge members 45a and 45b upwardly in FIG. 7. Such biasing action of spring 61 of the biasing with the retaining means in the position of FIG. 4 is blocked by over center link 75 since the force of spring arm 63 tends to push over center link 75 downwardly in a counterclockwise direction about its pivotal connection to trigger link 71 via tab 77a and bar 78a lying in appropriate slots formed in the side walls of link 75 as described previously. However, on swinging movement of pendulum mass 91 from the position of FIG. 4 to the position of FIG. 5, an upward movement of trigger link pad 72, moving trigger link 71 in a clockwise direction around its pivoted end adjacent flange 56, raises the right hand end of over center link 75 in FIG. 4 in a generally counterclockwise direction around its pivot point of arm 85 until the right hand end of link 75 is vertically overcenter such that link 75 pivots under the action of spring arm 63 in a counterclockwise direction to the position of FIG. 5 wherein actuator link arm 82 has raised the wedge members 45a and 45b via the interconnection of projection 47.

As particularly contemplated within the present invention, automatically operating reset means are provided for resetting the retaining means from the release position of FIG. 5, wherein the clamping means clamps webbing 11, to the releasable retaining position of FIG. 4 wherein the associated clamping means is in a webbing release position. In the exemplary embodiment, such means are illustrated generally at 100 in FIG. 2 and include a door operated mechanical switch 101 having a cable 102 within cable sheath 103 connected by a cable end fitting 104, as seen in FIGS. 1, 2, 3 and 6 to the free end of trigger link 71. The exemplary door operated switch 101 is provided with a slide rod or button 105 which is normally biased by a spring within housing 106 for urging button 105 outwardly of the vehicle frame 107 to which switch 101 is mounted via mounting cap 108. Slide rod or button 105 is connected at its inner end to cable 102 in such a manner that when the vehicle door is opened, the spring within housing 106 forces button 105 outwardly of the housing 106 drawing cable 102 through cable 103, which is fixed by cable support 109 mounted to support bracket 51 to thus pull the cable end fitting 104 and the associated free end of trigger link 71 downwardly in FIGS. 1-5 to move the trigger link 71, its associated overcenter link 75 and actuator link 80 from the release position of FIG. 5 to the retaining position of FIG. 4. The door open position for the exemplary reset means is illustrated in FIG. 2 with trigger means 104 being pull downwardly to the position of FIG. 4. The cable end fitting 104 is adapted to ride upwardly through an apertured tab portion of the free end of trigger link 71 so that on closing of the vehicle door, button 105 will move inwardly of housing 106 from the position of FIG. 2 to force the cable 102 upwardly relative the free end of the trigger link leaving it free to move upwardly to the position of FIG. 5 on actuation of the trigger by the exemplary vehicle inertia sensor means indicated generally at 90.

ALTERNATIVE EXEMPLARY EMBODIMENT

An alternative exemplary embodiment of the releasable retaining means for normally holding the clamping means in a webbing release position and automatically operating reset means for resetting the retaining means is shown in FIGS. 8 through 13. This exemplary releasable means operates in the same manner as the prior embodiment with like parts thereof being given like numerals plus one hundred.

Referring to FIGS. 8 through 13, the alternative embodiment of releasable retaining means includes a support bracket indicated generally at 150 having a bracket body 151 supported by a flange 152 to the clamping means housing 136. As seen particularly in FIG. 10 in this alternative exemplary embodiment, a single wedge member 145 is positioned between a rear clamp lock 141 and a front clamp lock 143 to wedgely clamp webbing 111 when foot 146 is raised by the actuator arm 182. As before, trigger link 171 having pad 172 on its free end is pivoted at its rearend on support flange 156 with a depending tab 173 maintaining it on the support. WHen the inertia sensor indicated generally at 190 senses a change in vehicle inertia, mass 191 swings pendulum head 193 beneath pad 172 to cause raising of the free end of trigger 171. The trigger ears 177a and 178a which pivotally ride in appropriately formed slots in overcenter link arms 177 and 178 cause tilting vertical movement of overcenter link 175 about its pivot pin 186 and, when sufficient tilting movement has been accomplished to free the action of spring 161, to tilt from the position of FIG. 9 to that of FIG. 12 under urging of the biasing means indicated generally at 160. As best seen in the exploded view of FIG. 13 actuator link 180 is biased by spring arm 163 in a counterclockwise direction about its pivot pin 183 to urge the left hand end of overcenter link 175 through its connection with link arm 181 in a downward direction. The right hand arm 182 of actuator link 180 protrudes through an appropriate aperture in support 151 to underly foot 146 of wedge member 145.

Figure 13:
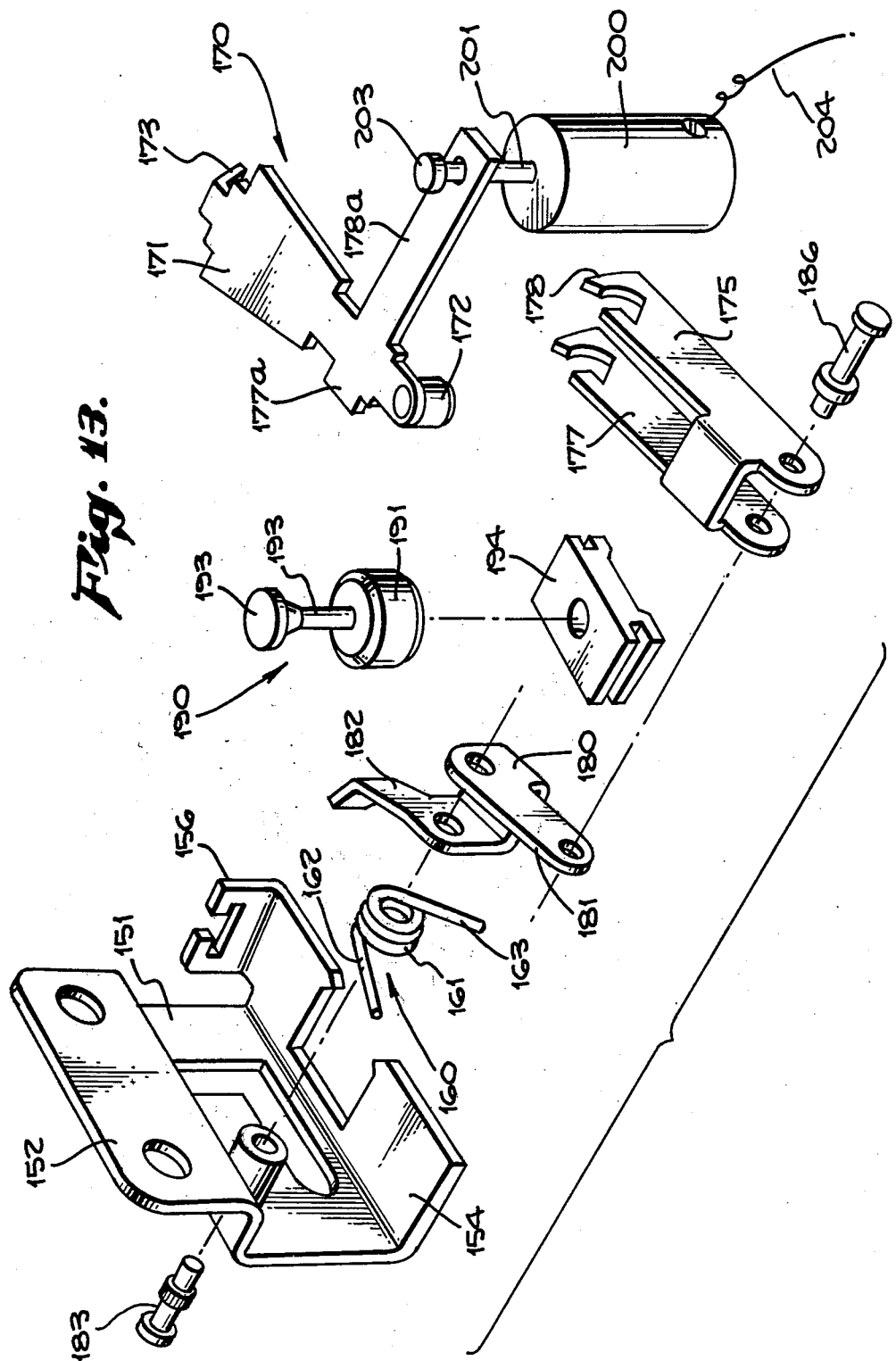
FIG. 13 is an exploded view of the alternative exemplary embodiment of releasable retaining means and automatically operating reset means of FIGS. 8 through 12.

As particularly contemplated in the present invention and as exemplified in the alternative embodiment being described, the automatically operating reset means may include a solenoid 200 having a moving rod 201 passing through an appropriate aperture in the outer end of trigger link ear 178a as best seen in FIGS. 8 and 13. The upper end 203 is larger than the aperture in ear 178a so that movement of rod 201 into the solenoid body will pull trigger link 171 back down into a reset condition. Operation of solenoid 200 may be accomplished in response to operation of the vehicle door by having an appropriate electrical circuit including lead line 204 running to a door operated switch, indicated generally at 205 and known per se, which is connected into a conventional vehicle battery indicated generally at 206. On opening of the vehicle door, normally open switch 205 closes under an appropriate spring bias to actuate the electrical circuitry associated with solenoid 200 to pull trigger link 171 from the position of FIG. 12 to the position of FIG. 9, thus resetting the releasable retaining means described and allowing wedge member 145 to be lowered through the engagement of its foot 146 with retainer means link arm 182 to the position of FIG. 10.

Having thus described exemplary embodiments of the safety belt webbing emergency locking apparatus including releasable retaining means for retaining a webbing locking means in a release position which is automatically operated in response to changes in vehicle inertia of more than a predetermined amount and automatically operating reset means for resetting such retaining means after the emergency condition experienced by the vehicle is over, the automatic operation being preferably on opening of the vehicle door, it should be now apparent to those skilled in the art that the various advantages and objects of the within invention have been attained by these embodiments and that various other modifications, embodiments and equivalent constructions may be made in view thereof within the scope of the present invention which is defined by the following claims.

I claim:

1. In a safety belt webbing emergency locking apparatus, for restraining a vehicle passenger in his seat, of the type having clamping means including one or more wedge shaped clamp members for clamping directly upon the webbing, biasing means for biasing said clamping means to a webbing clamping position preventing safety belt movement, releasable retaining means for normally holding said clamping means in a webbing release position against the bias of said biasing means and vehicle inertia sensor means for operating said releasable retaining means to release said clamping means to clamp said webbing preventing further movement thereof due to the bias of said biasing means, the improvement comprising the provision of:

reset means for resetting said retaining means to move said clamping means to said webbing release position and and hold it in said position against the bias of said biasing means in response to operation of another part of the vehicle, such as the vehicle door, by said vehicle passenger in predetermined manner.

2. In a safety belt webbing emergency locking apparatus of the type having a vehicle inertia sensor actuated safety belt locking means for preventing safety belt webbing protraction relative to the apparatus, said locking means being normally biased to a webbing locking position, the improvement comprising the provision of:

releasable retaining means for normally holding said safety belt locking means in a belt unlocking position, said retaining means including an actuator link pivotally mounted on said apparatus with one end connected to said belt locking means and having an opposite end, a trigger link having one end pivotally mounted on said apparatus and a free end, said free end having a contact surface engaging a part of said inertia sensor means, and an overcenter acting link connected between said actuating link opposite end and said trigger link free end to normally hold said actuator link against rotative movement until said overcenter acting link is moved in a predetermined manner by said trigger link, said trigger link being moved by said inertia sensor means when the latter senses a change in vehicle inertia of more than a predetermined amount; and reset means for automatically resetting said retaining means in response to operation of another part of the vehicle, such as the vehicle door, to place said safety belt locking means in said belt release position and to hold it in said position until said trigger link is operated upon by said inertia sensor means.

3. The improvement in safety belt webbing emergency locking apparatus of claim 2 wherein said releasable retaining means trigger link is actuated by associated inertia sensor means and said automatically operating reset means includes an electrical solenoid means for moving said trigger link to a reset position for said releasable retaining means and electrical circuitry and switch means are provided for operating said electrical solenoid means to move said trigger link to said reset position in response to operation of switch means by opening of the vehicle door.

* * * * *